(12) United States Patent
Craig (10) Patent No.: US 10,934,088 B2
(45) Date of Patent: Mar. 2, 2021

(54) MANWAY OPEN AND CLOSE ASSIST DEVICE

(71) Applicant: SRM, LLC, Springfield, MO (US)

(72) Inventor: James Craig, New Hartford, MO (US)

(73) Assignee: SRM, LLC, Springfield, MO (US)

( * ) Notice: Subject to any disclaimer, the term of this patent is extended or adjusted under 35 U.S.C. 154(b) by 135 days.

(21) Appl. No.: 16/251,894

(22) Filed: Jan. 18, 2019

(65) Prior Publication Data

US 2019/0218025 A1 Jul. 18, 2019

Related U.S. Application Data

(60) Provisional application No. 62/618,958, filed on Jan. 18, 2018.

(51) Int. Cl.
| | |
|---|---|
| *E05F 1/00* | (2006.01) |
| *B65D 90/10* | (2006.01) |
| *B65D 90/00* | (2006.01) |
| *B61D 17/16* | (2006.01) |
| *F16J 13/18* | (2006.01) |
| *E02D 29/14* | (2006.01) |

(52) U.S. Cl.
CPC .............. *B65D 90/10* (2013.01); *B61D 5/08* (2013.01); *B61D 17/16* (2013.01); *F16J 13/18* (2013.01); *E02D 29/1418* (2013.01); *E02D 29/1463* (2013.01); *E05Y 2900/612* (2013.01)

(58) Field of Classification Search
CPC . B65D 90/10; B65D 90/22; B61D 5/08; F16J 13/18; E05Y 2900/612; E02D 29/1463; E02D 29/1418; B66F 19/005

USPC ............ 49/386, 387; 16/277, 286, 306, 308; 52/20

See application file for complete search history.

(56) References Cited

U.S. PATENT DOCUMENTS

| | | | | |
|---|---|---|---|---|
| 2,626,421 A | * | 1/1953 | Lyons .................. | E05F 1/1215 16/300 |
| 3,624,864 A | * | 12/1971 | Marr ...................... | E05F 3/102 16/62 |
| 5,038,520 A | * | 8/1991 | Amorese .............. | E05F 1/1261 49/386 |
| 5,485,760 A | * | 1/1996 | Lange ................. | F16H 25/2204 403/3 |

(Continued)

FOREIGN PATENT DOCUMENTS

CA       2941937 A1 * 3/2017 ............... E04H 7/22

*Primary Examiner* — Jerry E Redman
(74) *Attorney, Agent, or Firm* — Husch Blackwell LLP (57) ABSTRACT

A manway open and close assist device that is operably connected to at least one upper hinge attachable to a manway cover and a lower hinge attached to a vessel or tank. The device comprises. A disc-like piston is mounted on a threaded input screw and at least one anti-rotation member to provide linear translation of the piston due to rotation of the input screw. A cylindrical and tubular housing that receives the threaded input screw, the anti-rotation member, and the piston, wherein the housing has a plurality of helical grooves disposed in its inner surface that receive teeth on the outer surface of the piston. The housing may be fixed to the upper hinge member(s) and a rotation of the housing and attached hinge member(s) is effectuated by rotating the input screw and resulting linear movement of the piston to open and close the manway cover.

14 Claims, 7 Drawing Sheets

(56) References Cited

U.S. PATENT DOCUMENTS

| | | | | |
|---|---|---|---|---|
| 5,600,868 | A | * | 2/1997 | Tourville .............. E05F 1/1223 16/277 |
| 5,671,652 | A | | 9/1997 | Weyer |
| 5,971,472 | A | * | 10/1999 | Schreiter .................... B60J 7/22 16/307 |
| 6,859,978 | B2 | * | 3/2005 | Pan ..................... H04M 1/0216 16/277 |
| 7,216,459 | B1 | * | 5/2007 | Akkala ................... E02D 29/14 16/285 |
| 2009/0183658 | A1 | * | 7/2009 | McDougle .......... E02D 29/1418 109/59 T |
| 2011/0192848 | A1 | * | 8/2011 | Lollis ....................... F16J 13/08 220/327 |
| 2016/0001934 | A1 | * | 1/2016 | Craig .................... B65D 47/00 220/254.1 |
| 2016/0287799 | A1 | * | 10/2016 | Blancke ............ A61M 5/31551 |
| 2018/0313131 | A1 | * | 11/2018 | Matye .................. E05B 65/001 |

* cited by examiner

MANWAY OPEN AND CLOSE ASSIST DEVICE

CROSS-REFERENCE TO RELATED APPLICATIONS

This Application claims priority to U.S. Provisional Patent Application No. 62/618,958, filed Jan. 18, 2018, entitled "Manway Open and Close Assist Device" filed by SRM, LLC d/b/a Holloway America, the entire disclosure of which is incorporated herein by reference.

BACKGROUND

Manways are positioned on tanks and pressure vessels to access the contents, allow personnel to enter vessels or tanks for cleaning purposes, and/or a number of other purposes. During processing or storage, the manways are closed. To access the contents, allow personnel to enter vessels or tanks for cleaning purposes, and/or perform other activities, the manway cover must be opened. These tanks and pressure vessels are typically constructed of metal, including but not limited to steel, stainless steel or aluminum. As such, the manway covers are often heavy and awkward to open. Thus, opening a manway cover now can be a straining and awkward operation as the operator has to lift the weight of the manway cover up and swing it away from the operator as the manway cover is often mounted to the tank or vessel by a hinge. Thus, the operator must often reach over the open manway to push the cover to an "open" position. This puts the operator in a position to potentially fall in the open manway or to drop the partially open manway cover back to a closed position possibly injuring the operator or someone else in the way of a falling manway cover. The same issues are present when the manway is being closed by the operator.

Accordingly, there is a need in the art for an ergonomic, safe and inexpensive means of opening and closing pressure vessel and storage tank manway covers.

SUMMARY OF THE INVENTION

A manway open and close assist device comprises a threaded input screw mounted for rotation on a first end member and a second end member. In addition, one or more anti-rotation members may be fixed to the first end member. The first end member may be operably connected to a first lower hinge member. The lower hinge member may be connected to a vessel or tank. A piston having an internal aperture having a threaded inner surface, wherein the threaded input screw may be received and threadedly engaged with the piston's internal aperture. The piston may have through apertures allowing the piston to be mounted on the one or more anti-rotation members for linearly movement relative thereto. The piston may include a plurality of teeth or splines disposed on an outer surface of the piston.

The manway open and close assist device may also include a tubular housing for receiving the threaded input screw, the anti-rotation member, and the piston, wherein the housing has a plurality of helical grooves disposed in an inner surface of the housing. The plurality of helical grooves receives the plurality of teeth or splines of the circular piston to create threaded engagement therebetween. The housing may be operably connected to at least one upper hinge member. The upper hinge member may be connected to a manway cover. The rotation of the input screw may cause a linear displacement of the piston as guided by the anti-rotation member. The linear displacement of the piston within the housing may cause a rotation of the housing due to engagement of the plurality of helical grooves in the inner surface of the housing with the plurality of teeth or splines of the piston, thereby causing a pivoting movement of at least one upper hinge member and movement of the manway cover.

The manway open and close assist device may also include an embodiment wherein the first end member is disposed proximate a first end of the housing and the second end member is disposed proximate to a second end of the housing. In one embodiment, the second end member maybe fixedly connected to both the second end of the housing and at least one upper hinge member so as to transfer torque from the housing to the upper hinge member to open and close the manway cover.

In another embodiment, the manway open and close assist device may include (a) the first end member being disposed at a first end of the housing, and (b) the second end member fixed to a second lower hinge member and is disposed at a second end of the housing. In this embodiment, bushings may be disposed between the first and the second end members and the housing so that the housing rotates relative to the end members. In this embodiment, the housing may include a plurality of keys disposed at the first and the second ends of the tubular housing, and the upper hinge members may include a plurality of slots. With this structure, the tubular housing may be operably connected to the first upper hinge member by the plurality of keys at the first end of the tubular housing being received into a plurality of slots of the first upper hinge member. Similarly, the plurality of keys at the second end of the tubular housing may be received into the plurality of slots of the second upper hinge member to operably connect the tubular housing to the second upper hinge member. This connection transfers torque from the housing to both of the upper hinge members simultaneously so as to be able to transfer more torque to open and close the manway cover.

In one embodiment, the threaded input screw may be manually rotated through the use of a wheel or handle being attached to one end of the input screw. In another embodiment, one or more ends of the screw may be configured so as to engage with a socket or screw or other like shape so that the manway cover can be rotated using an electric drill or driver. In yet another embodiment, a servo motor may be operably connected to the input screw so that the rotation of the screw can be automatically carried out by the servo motor. The screw and piston are configured so that rotating the screw in a first direction opens the manway cover and rotating the screw in an opposite direction closes the manway cover.

Other aspects and advantages of the present invention will be apparent from the following detailed description of the preferred embodiments and the accompanying drawing figures.

BRIEF DESCRIPTION OF THE SEVERAL VIEWS OF THE DRAWING

The accompanying drawings form a part of the specification and are to be read in conjunction therewith, in which like reference numerals are employed to indicate like or similar parts in the various views, and wherein.

DETAILED DESCRIPTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

The present invention is a manway open and close assist device 100 that allows the operator to be positioned beside the manway when it is being opened or closed and, therefore, the operator is never located over the manway opening during the process of opening and closing the manway cover. The present invention allows the manway cover to be mechanically locked in any position from the full open to the full closed positions preventing the cover from falling and causing harm to an individual in the path of the falling cover. In addition, the invention reduces the strain on the operator by reducing the required force to operate the opening or closing of the manway cover. Due to the mechanical advantage provided by the mechanism the input torque is significantly less than the output torque. This means a small power unit similar to a cordless drill motor can be used to open and close the manway cover instead of the operator having to manually lift the entire weight of the manway cover about the pivot point of the hinge with no mechanical assistance, which often requires a force of twenty five (25) pounds or more.

Figure 1:
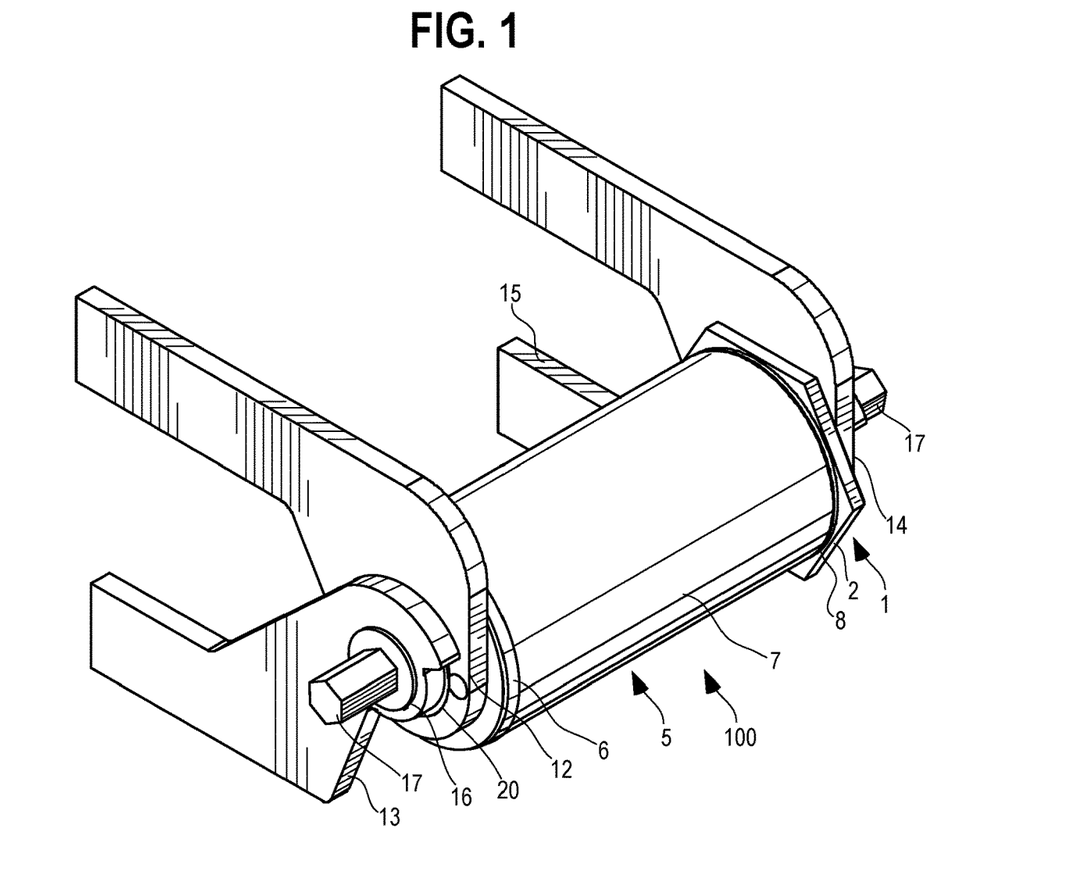
FIG. 1 is a top perspective view of one embodiment of a manway open and close assist device in accordance with the teachings of the present invention.
Figure 3:
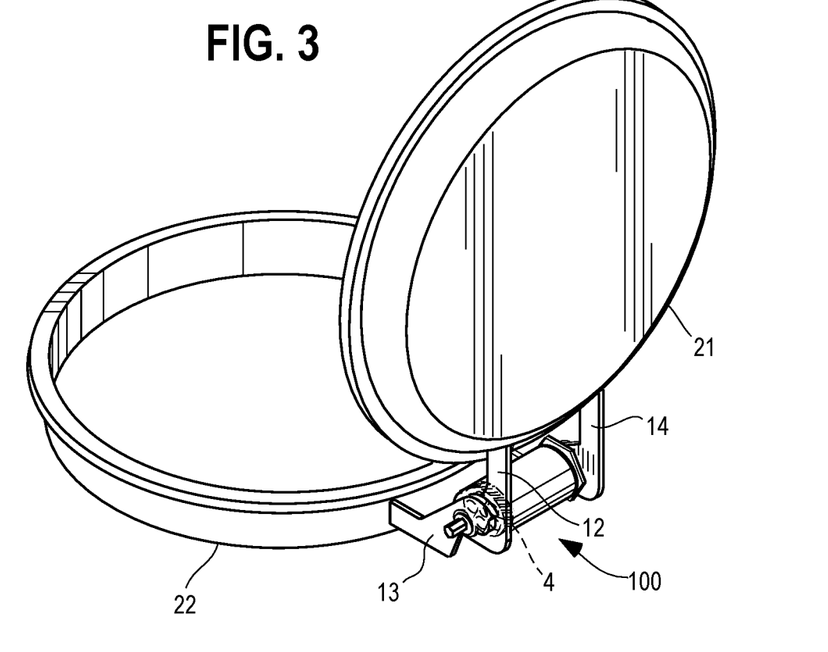
FIG. 3 is a top perspective view of one embodiment of a manway open and close assist device in accordance with the teachings of the present invention shown installed for operation with the manway cover in an open position.
Figure 4:
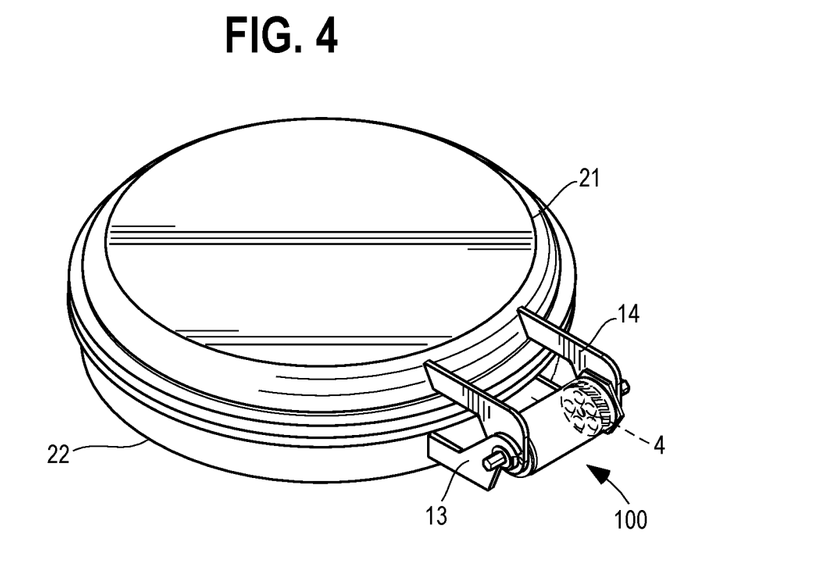
FIG. 4 is a top perspective view of one embodiment of a manway open and close assist device in accordance with the teachings of the present invention shown installed for operation with the manway cover in a closed position.

FIG. 1 illustrates an embodiment of manway open and close assist device 100 including a fixed end assembly 1 having a fixed end cap 2; a rotating subassembly 5 having a rotary end cap 6; an outer housing/outer helix 7; a bushing 8 between the outer housing 7 and fixed end cap 2; and hinge components 12-15 which connect the present device 100 to the vessel/tank/manway collar 22 and manway cover 21 (see FIGS. 3 and 4). The manway open and close assist device 100 also includes thrust washers 16 located between an input hex adapter thrust retainer nut 17 and a bushing 20 as necessary for the hinge design.

Figure 2:
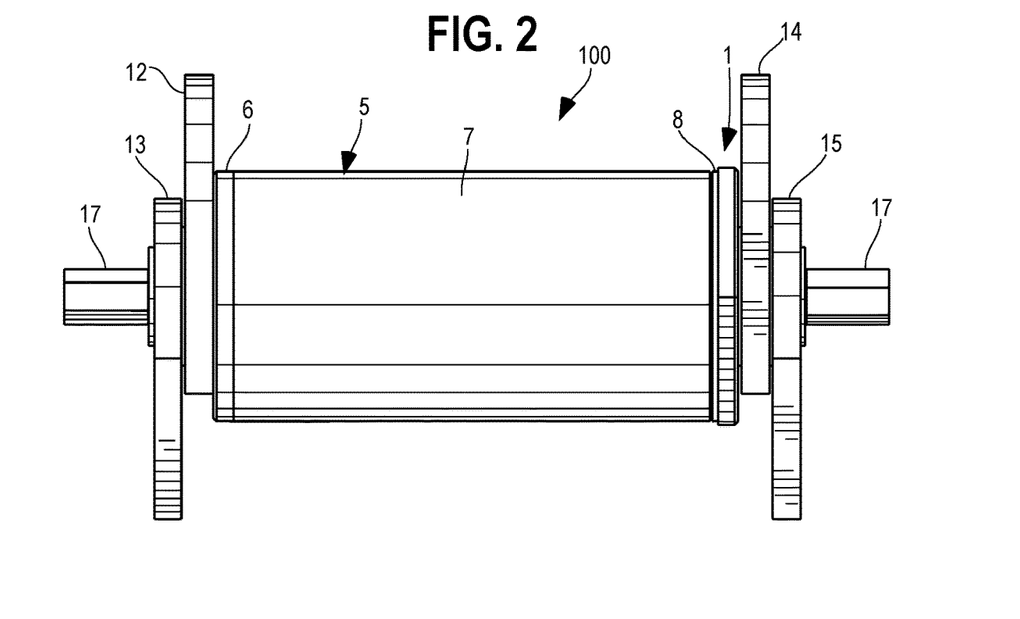
FIG. 2 is a back view of one embodiment of a manway open and close assist device in accordance with the teachings of the present invention.

FIG. 2 is another view of the embodiment of manway open and close assist device 100 shown in FIG. 1, specifically identifying hinge components 12-15, namely left and right upper hinges 12 and 14, and left and right lower hinges 13 and 15.

FIGS. 3 and 4 show manway open and close assist device 100 being used wherein lower hinge members 13 and 15 are connected to a manway collar 22 and upper hinge members 12 and 14 are connected to a manway cover 21, with manway open and close assist device 100 operable to move cover 21 relative to collar 22 between the closed position of FIG. 4 and the open position of FIG. 3. Manway collar 22 is generally mounted on a pressurized vessel or other tank. As shown in FIG. 3, piston 4 is moved linearly to the left side of the device 100 when the manway cover is open and, as shown in FIG. 4, piston 4 is moved linearly to the right side when the manway cover is closed.

Figure 5:
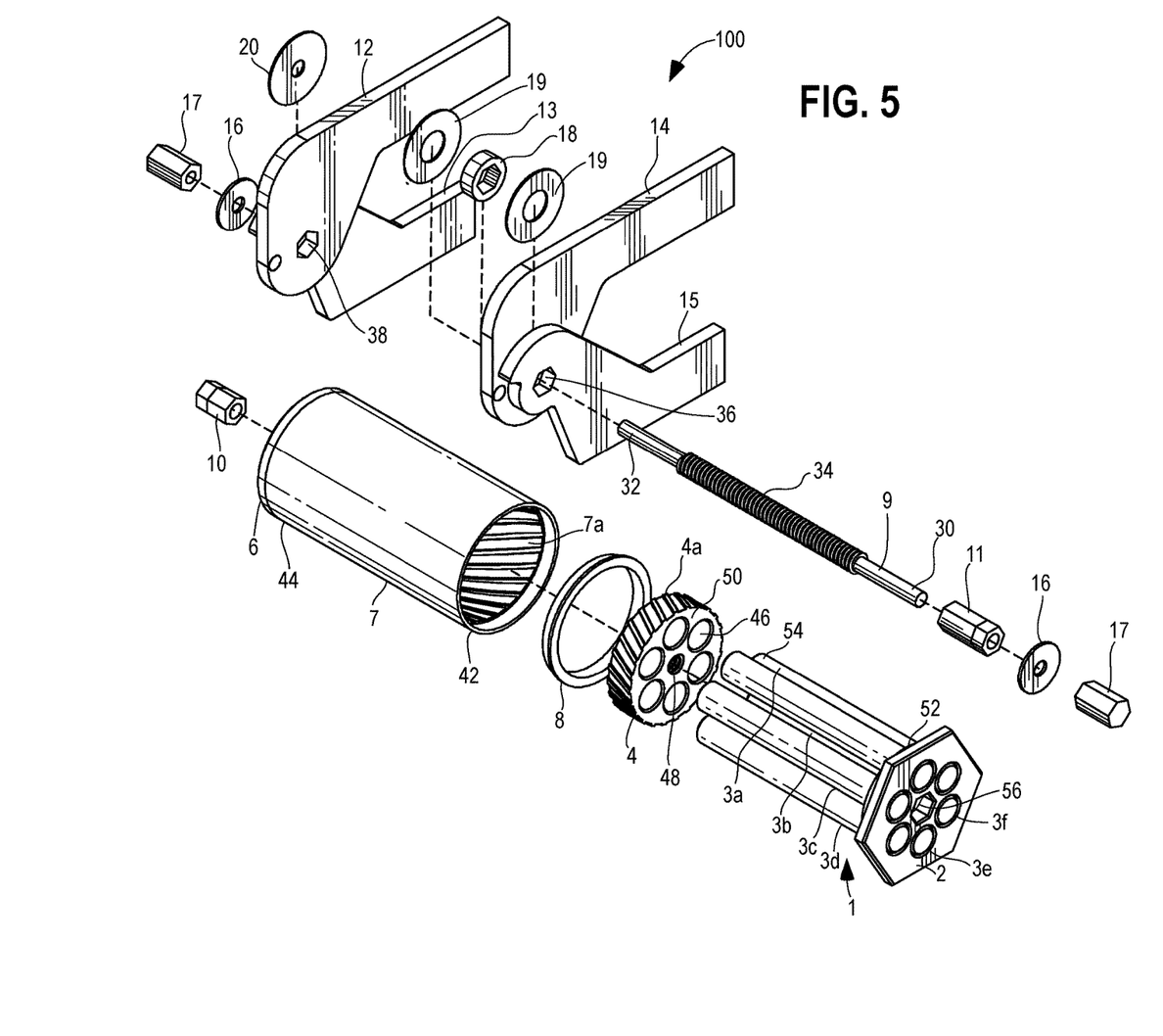
FIG. 5 is an exploded perspective view of one embodiment of a manway open and close assist device in accordance with the teachings of the present invention.

FIG. 5 is an exploded view of an embodiment of manway open and close assist device 100. FIG. 5 shows a number of anti-rotation rods 3a, 3b, 3c, 3d, 3e and 3f being fixedly coupled to fixed end cap 2. Anti-rotation rods have a first fixed end 52 attached to fixed end plate 2 and a free end 54. In this embodiment, six anti-rotation rods 3 are utilized, but any number of rods 3 may be implemented to sufficiently prevent rotation of a piston 4 inside housing 7 when no input force is applied to retainer nut 17. The number of anti-rotation rods may depend upon the mass of the manway cover, the diameter of the manway opening and cover, and/or diameter of the housing 7 that receives the anti-rotation rods 3. Manway open and close assist device 100 also includes a input lead screw 9 that is mounted with respect to housing 7 and hinges 12-15 by a drive hex mounting adapters 10 and 11, which can be of varying designs based on the particular application, for example could be a hex bushing as shown or a bolted flange, or a keyed shaft.

Figure 6:
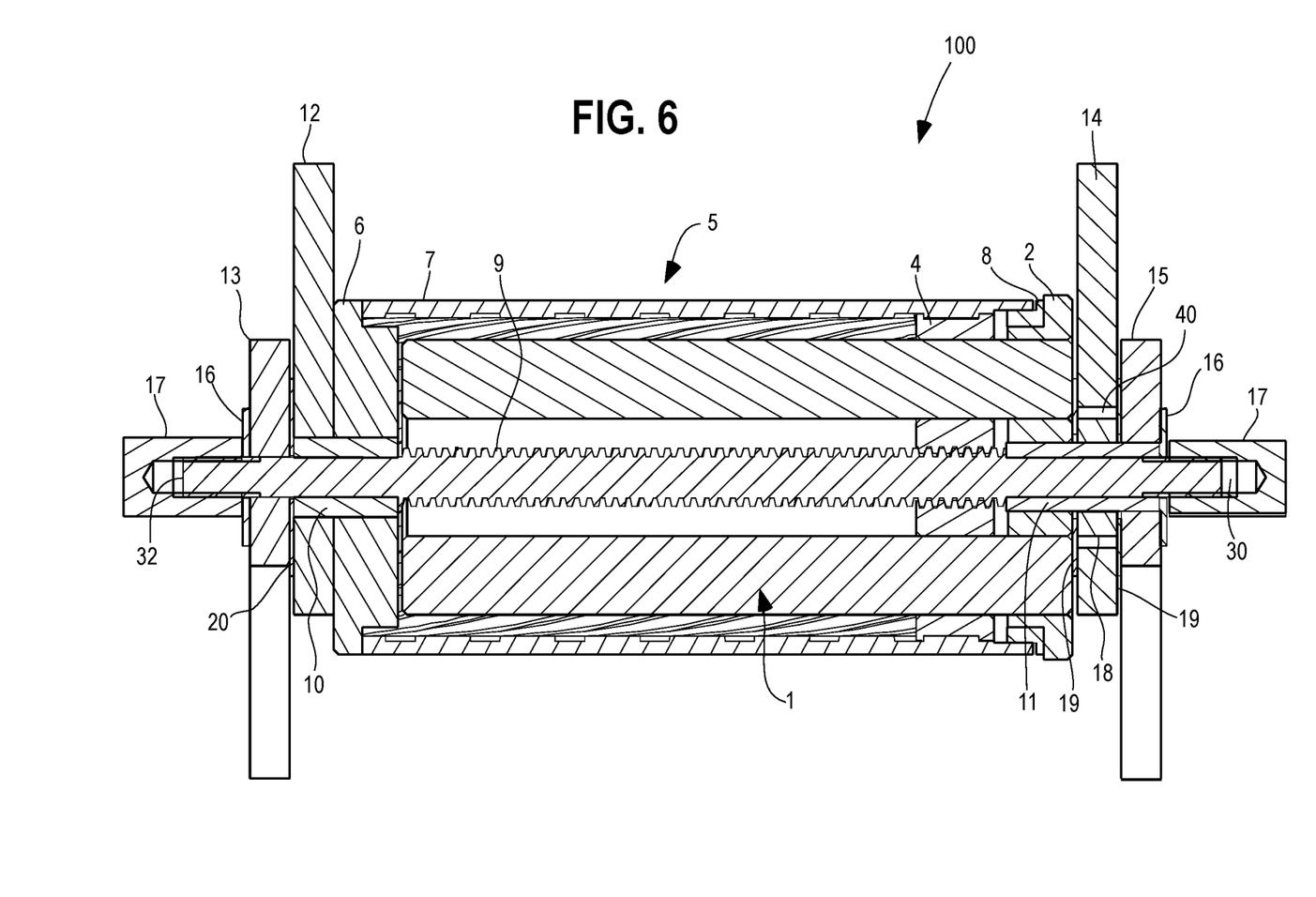
FIG. 6 is a cross sectional view of the embodiment of a manway open and close assist device of FIG. 7 cut along the line 6-6.

Further, FIG. 5 shows lead screw 9 having a first end 30, a second end 32, and a threaded middle portion 34. The right lower hinge includes a hexagonal shaped aperture 36 to receive mounting adapter 11. In one embodiment, the left lower hinge includes a round aperture (not shown) to allow the end 32 of lead screw 9 to pass through. Similarly, left upper hinge 12 includes a hexagonal shaped aperture 38. FIG. 5 shows two washers 19 which sandwich a bushing 18 having a hexagonal shaped opening to receive mounting adapter 11. FIG. 6 shows bushing 18 aligned within a rotation allowing aperture 40 that is defined in right upper hinge 14 aligned with aperture 36 of right lower hinge 15. The bushing 18 helps support lead screw 9, but allows relative rotation of the right upper hinge 14 relative to end 2 and screw 9. FIG. 6 also shows washers 19 sandwiching bushing 18 in an installed position. A circular or round aperture exists in the right upper hinge 14. The hinge 14 is allowed to rotate around the bushing 18 which is fixed in rotational alignment with the mounting adapter 11. Turning back to FIG. 5, housing 7 also includes a first end 42 and a second end 44. Further, fixed end cap 2 includes a hexagonal shaped aperture 56 for receiving mounting adapter 11. In addition, rotating end cap 6 may also have a hexagonally shaped aperture for receiving item 10 which also extends to the left upper hinge 12 aperture 38.

FIGS. 5 and 6 show how the component parts are positioned and assembled. Anti-rotation rods 3a-e may be press fit and seal welded into the fixed end cap 2 to make the fixed end subassembly 1. The fixed end subassembly 1 is mounted such that it does not rotate with respect to fixed lower hinge 15 via the stationary mounting adapter 11 (stationary hex bushing in this embodiment). Piston 4 has holes 46 drilled through the planar faces (front face 50 and back face not labeled) of piston 4 in a pattern to match the pattern or arrangement of anti-rotation rods 3 and the piston is slid over the anti-rotation rods 3 and mounted for linear movement thereon. Piston 4 includes a threaded aperture 48 disposed proximate its center of rotation, wherein the threaded aperture 48 has threads on the inner surface to match the threads of the threaded portion 34 of lead screw 9. This subassembly allows piston 4 to move linearly to and from the fixed end through rotation of lead screw 9, while not allowing the piston 4 to rotate with respect to the fixed end subassembly 1. Rotary end cap 6 and outer housing-outer helix 7 are welded or otherwise coupled together to form rotating subassembly 5.

Rotary subassembly 5 is assembled over the fixed end subassembly 1 and piston 4. The radial extending helical splines 4a (or teeth) on the outer surface of piston 4 are lined up and inserted into the helical splines/grooves 7a in the outer housing-outer helix. The helical splines/grooves 7a have a length that substantially corresponds to the length of the cover 7. The helical splines/grooves 7a of housing 7 will have an angular orientation and length to provide a desired mechanical advantage and/or the radial displacement of housing 7. In one embodiment, the angular orientation and the length of the groove 7a provides for a radial rotation of the housing 7 between ninety (90) and one-hundred eighty (180) degrees. At this point the assembly process, rotating subassembly 5 is free to rotate within the limits of the linear motion of the piston as there is nothing to restrain the piston from moving linearly and driving the rotation of subassembly 5.

Input lead screw 9 is installed through the assembly by threading it through the piston and extending it through the entire assembly. Input lead screw 9 may be journaled for rotation on at least said lower hinge members 13 and 15. Input lead screw 9 also includes a threaded portion 34 having a length, wherein the length of the threaded portion provides a desired linear displacement of piston 4 corresponding to the length of groove 7a in housing 7. In one embodiment, both ends of the power lead screw 9 are fixed with a locking mechanism 16 and 17 (retainer nuts, rings, threaded fasteners, etc.) to prevent the lead screw 9 from moving due to the internal linear thrust of the mechanism. At this point in the assembly, the mechanism is locked so that the rotating subassembly 5 cannot rotate relative to the fixed subassembly 1 without applying torque to the input lead screw 9.

Various methods of mounting the manway open and close assist device 100 can be used. In this embodiment a stationary hex mounting adapter 11 is used to restrain the rotation of the fixed end subassembly 1 so it remains aligned with the stationary lower hinge 15. Also in this embodiment a drive hex mounting adapter 10 is used to transfer the rotational motion of the rotating subassembly 5 to the upper hinge 12. Other methods of mounting and transferring the rotational torque from rotating subassembly 5 to the hinges may be employed such as keyed shafts and holes, bolted flange connections etc. Variations of the mounting are within the scope of the present invention.

Figure 7:
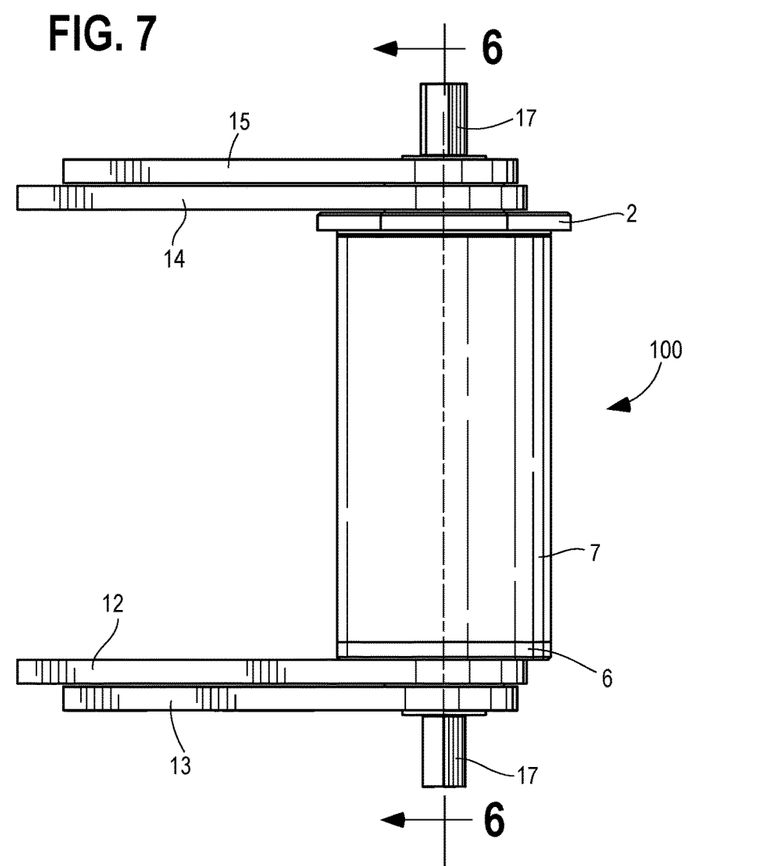
FIG. 7 is a top view of one embodiment of a manway open and close assist device in accordance with the teachings of the present invention.
Figure 8:
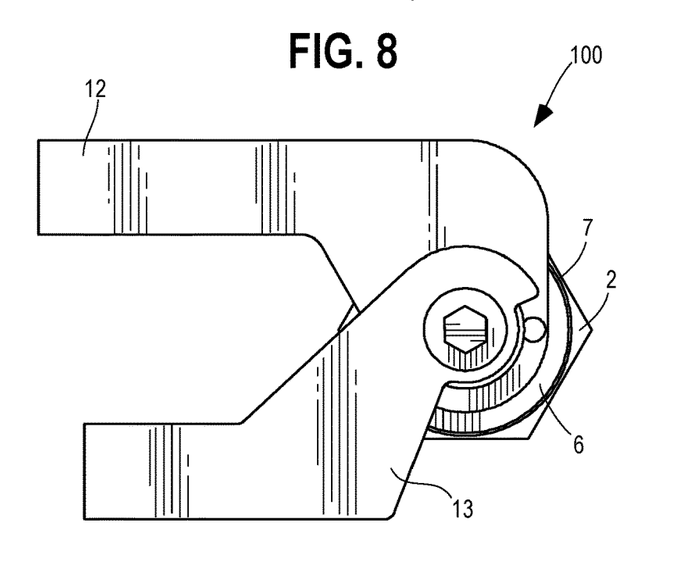
FIG. 8 is a side view of one embodiment of a manway open and close assist device in accordance with the teachings of the present invention.

FIGS. 7 and 8 illustrate a top and side view of the assembled manway open and close assist device 100.

Figure 9:
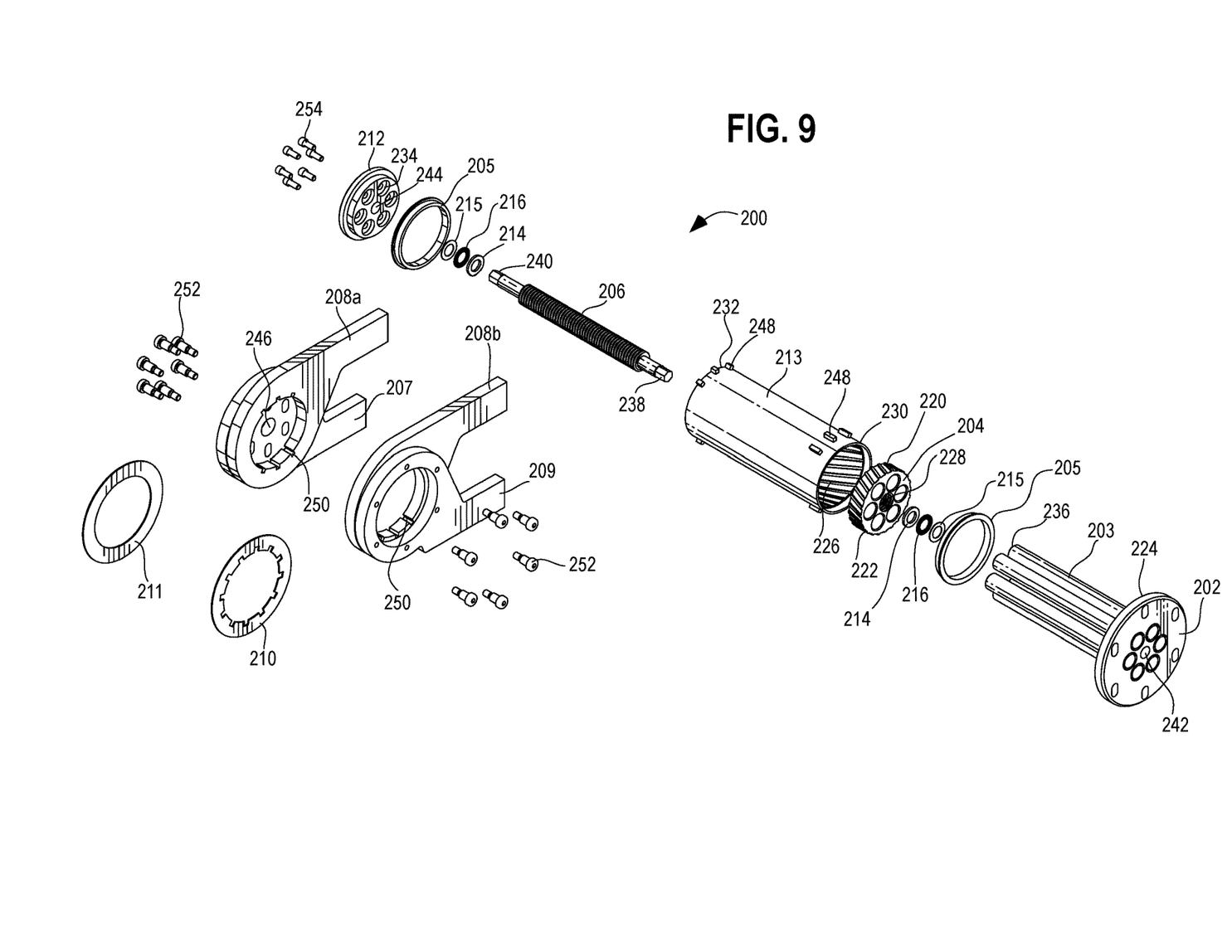
FIG. 9 is an exploded perspective view of one embodiment of a manway open and close assist device in accordance with the teachings of the present invention.

FIG. 9 illustrates another embodiment of the manway open and close assist device 200 which provides a rotational drive to both upper hinge members. In particular, manway open and close assist device 200 includes a fixed end cap 202 that includes six anti-rotation rods 203 orientated radially around the fixed end cap and extending away from an inward facing surface 224 of the fixed end cap 202. Any number of anti-rotation rods 203 is within the scope of the present invention. A disc-shaped piston 204 may include a plurality of teeth or splines 220 extending outwardly from the circumferential outer surface 222. Disc-shaped piston 204 may also include a threaded aperture 228 located proximate its center. Manway open and close assist device 200 also includes an outer housing/outer helix 213 which is a tube shape and includes an inner surface 226 includes helical grooves to be complementary to the teeth or splines 220 of piston 204. Outer housing/outer helix 213 has a first end 230 and a second end 232.

Manway open and close assist device 200 further includes a second fixed end cap 212. Second end cap 212 includes six housings 234 disposed to receive a free ends 236 of each anti-rotation rods 203. A plurality of screws 254 may be utilized to secure second end cap 212 to free ends 236 one or more anti rotation rods wherein the free ends 236 include a threaded hole to receive such screws 254. A bushing 205 is disposed between each end 230 and 232 of the outer housing 213 and each fixed cap 202 and 212 as shown to allow the outer housing 213 to rotate relative to the fixed end caps 202 and 212.

Figure 10:
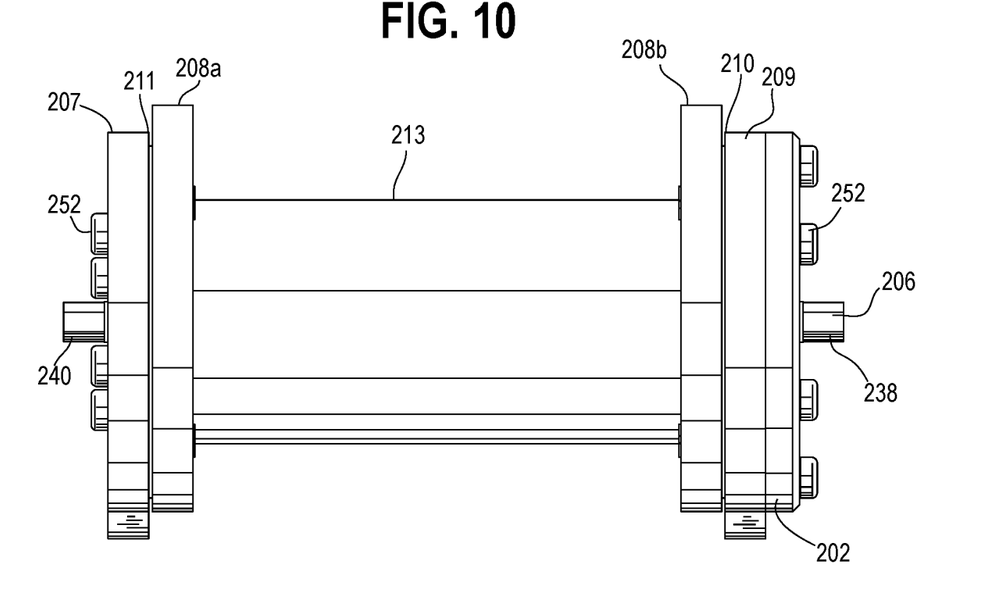
FIG. 10 is a back view of one embodiment of a manway open and close assist device in accordance with the teachings of the present invention.

A lead screw 206 includes a threaded outer surface, a first end 238 and a second end 240. The threaded outer surface is configured to matingly engage the threaded aperture 228 of piston 204, wherein piston 204 is disposed for displacement within the outer housing/helix 213 upon rotating the lead screw 206. As best shown in FIGS. 9 and 10, first end 238 of lead screw 206 is not threaded and is configured to pass through an aperture 242 through the first end cap 202, and a second end 240 of lead screw 206 is similarly not threaded and configured to pass through aperture 244 of second end cap 212. Further, second end 240 of lead screw 206 is configured to pass through an aperture 246 in a first lower hinge 207. Another alternative is that either end of lead screw 24 may not extend through the hinges or outward of the hinges as long as the ability to rotate the lead screw is maintained.

Manway open and close assist device 200 includes lower hinges 207 and 209 and two upper hinges 208a and 208b. Lower hinges 207 and 209 will be coupled to a vessel or tank proximate the manway opening and upper hinges 208a and 208b will be configured for coupling to the manway cover similar to that shown in FIGS. 3 and 4. A template may be implemented for installing the present manway open and close assist device 200. Further, a first washer 211 may be disposed between lower hinge 207 and upper hinge 208a, and a second washer 210 may be disposed between lower hinge 209 and upper hinge 208b. Washers 210 and 211 reduce friction between hinge pieces during operation of the manway open and close assist device 200.

As further shown in FIG. 9, a series of a rotating thrust washer 214, a stationary thrust washer 215 and a thrust bearing 216 may be disposed at each end 238, and 240 of lead screw 206. In addition, outer housing/helix 213 has a plurality of keys 248 disposed on its outer surface 250, wherein one or more keys 248 are disposed proximate first end 230 and one or more keys 248 are disposed proximate second end 232 as shown. Keys 248 are arranged around the perimeter of the outer housing 213 to align with a plurality of slots 250 disposed in upper hinge members 208a and 208b so that the keys 248 are received in the slots 250 when the manway open and close assist device 200 is assembled. The number of keys 248 and slots 250 can be selected based upon the torque applied by the double screw mechanism and the weight of the manway cover. The more torque transferred to the upper hinges 208a and 208b, the more keys 248 and slots 250 can be implemented.

FIG. 10 shows the manway open and close assist device 200 in an assembled position showing from right to left first end cap 202 coupled to lower hinge 209 using a plurality of fasteners 252 (see FIG. 9). Fasteners 252 may be any fastener now known or hereafter developed, but in this embodiment the fasteners 252 are machine screws. Washer 210 is disposed between lower hinge 209 and upper hinge 208b and outer housing 213 is received into both lower hinge 209 and upper hinge 208b. Outer housing 213 is also received into upper hinge 208b and then end plate 212 is coupled to lower hinge 207 with a plurality of fasteners 252 wherein bushing 205 allows outer housing 213 to rotate relative end plate 212 (per exploded view in FIG. 9). Further, washer 211 is disposed between upper hinge 208b and lower hinge 207.

Figure 11:
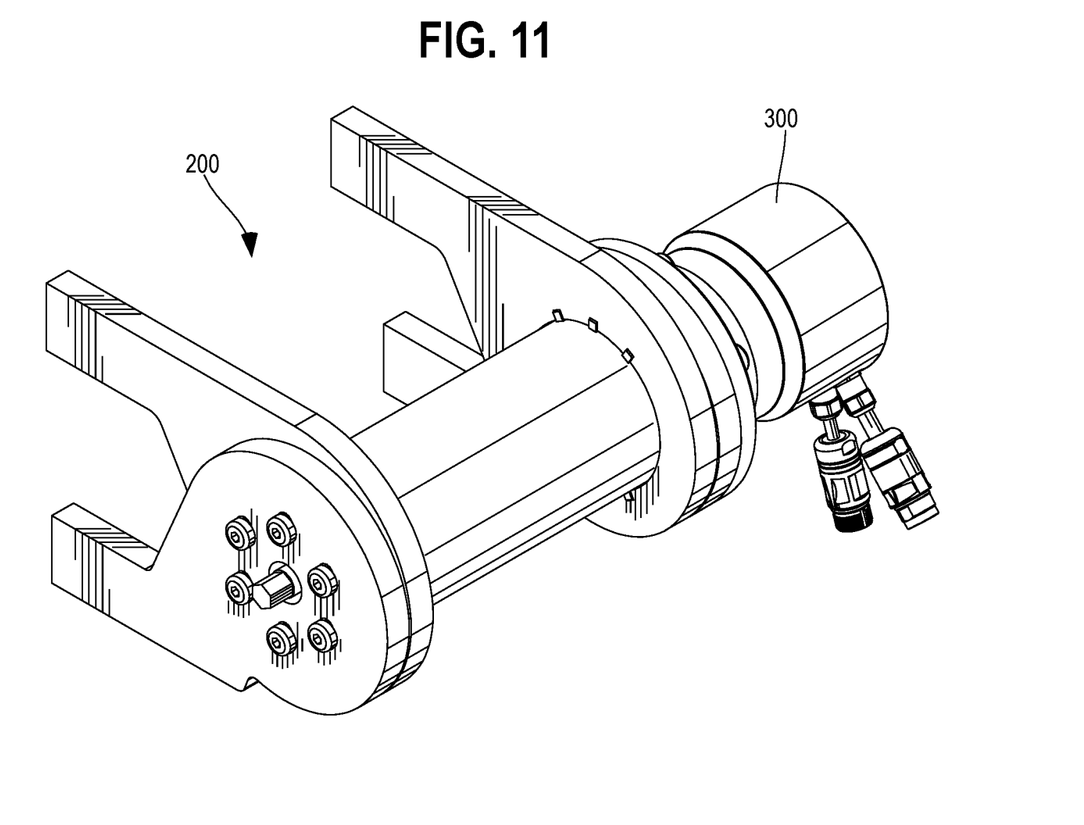
FIG. 11 is a top perspective view of one embodiment of a manway open and close assist device in accordance with the teachings of the present invention.

FIG. 11 shows an embodiment of manway open and close assist device 100 or 200 which includes a servo motor 300 operably connected to the lead screw 9 or 206 so as to automate the rotation of the lead screw 9 and 206 to mechanize the raising and lowering of a manway cover.

In operation, manway open and close assist device 100 works by having the fixed end assembly 2 attached to the fixed hinge 15 of the manway. The rotating subassembly 5 is attached to the moving hinge 12 of the manway. In one embodiment, torque is applied to the power lead screw 9 through retainer nut 17 in the appropriate direction such that the manway cover 21 is opened or closed as desired. Torque may be applied to the screw 4 using any manual or power-driven device. For example, a wheel or lever may be disposed to turn the input lead screw 9, or a power drill with a driver bit could be used to engage and turn input lead screw 9. As the piston 4 travels linearly through the housing due to the rotation of lead screw 9, the threaded engagement of the splines of outer surface of piston 4 and the grooves 7a or threads on inner surface of housing 7 results in a torque being generated due to the helical path of the grooves 7a. This causes a rotation of the housing 7, which is then transferred to the attached hinge 15.

For manway hinge applications the preferred configuration is to have manway open and close assist device 100 to be installed between the hinges of the manway such that the fixed end 2 is attached to the lower fixed hinge 15 on one side and the rotating end 6 is attached to the rotary hinge 12 on the other side. In one embodiment, the power lead screw 9 can be accessed from either side of the assembly to enable power input to either side of the mechanism. This allows for access to right side mounted hinges and left side mounted hinges without requiring separate configurations of the manway assist or hinges. However, a single drive location is also within the scope of the present invention. Further, the present manway open and close assist device 100 could be utilized in other applications where a heavy lid or cover is routinely opened and closed.

Similarly, manway open and close assist device 200 works in a similar manner. However, manway open and close assist device 200 includes the housing 213 transmitting torque to both upper hinges 208a and 208b through keys 248. Torque may be applied to lead screw 206 using any manual or power-driven device. For example, a wheel or lever may be disposed to turn the input lead screw 206, or a power drill with a driver bit could be used to engage and turn input lead screw 206, or, as shown in FIG. 11, a servo motor can be operably connected to drive lead screw 206.

For manway hinge applications the preferred configuration of deploying manway open and close assist device 200 to be installed between the hinges of the manway such that the fixed ends 202 and 212 are fixed to the lower hinges 207 and 209 with bushings 205 disposed between the ends 202 and 212 and the housing 213 to allow for relative rotation between the housing 213 and ends 202 and 212. The configuration of manway open and close assist device 200 allows the raising and lowering mechanism to be slid into the installed hinges through the opening in the lower hinge 209 as shown in FIGS. 9 and 10. The power lead screw 206 can be accessed from either side of the assembly to enable power input to either side of the mechanism. This allows for access to right side mounted hinges and left side mounted hinges without requiring separate configurations of the manway assist or hinges. However, a single drive location is also within the scope of the present invention. Further, the present manway open and close assist device 200 may be desirable in other applications where a heavy lid or cover is routinely opened and closed.

One feature of the present manway open and close assist device 100 and 200 is that in one embodiment, the use of the anti-rotation rods enable the manway cover 21 to be left and locked in any position from full open to full closed and the manway open and close assist device 100 will hold the manway cover at that position indefinitely.

This assembly can be manufactured from a variety of materials. The material selection is not relevant to the patent as they could change based on the particulars of the final application. For instance, a sanitary application would require the housing and all exposed components to be manufactured from some type of stainless steel. In an industrial application this same mechanism could be manufactured from carbon steel, aluminum, or other metal. For lighter applications, polymers or other polymeric materials may also be used.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

I claim:

1. A manway open and close assist device comprising:
a threaded input screw;
a piston having a threaded aperture sized to receive said threaded input screw, wherein the piston is mounted on said threaded input screw in a threaded engagement and said piston includes a plurality of teeth disposed on an outer surface of said piston;
a tubular housing configured to receive said threaded input screw and said piston, wherein said tubular housing has a plurality of helical grooves disposed on an inner surface of said tubular housing, said plurality of helical grooves receiving said plurality of teeth of said circular piston;
wherein said tubular housing is operably connected to a manway cover to transfer a torque applied to said tubular housing to the manway cover.

2. The manway open and close assist device of claim 1 further comprising said tubular housing having a second end member fixedly attached at a second end of said tubular housing, and a first end member disposed at a first end of said tubular housing whereby said tubular housing is disposed for rotation relative to said first end member.

3. The manway open and close assist device of claim 2 further comprising an upper hinge member operably connecting said second end member and the manway cover.

4. The manway open and close assist device of claim 1 further comprising one or more anti-rotation member fixed to said first end member and received within said tubular housing, said one or more anti-rotation member comprises a rod, wherein said piston is slidably mounted on said rod, and wherein said one or more anti-rotation members guides said piston in a linear direction within said tubular housing and prevents said piston from rotating within said tubular housing.

5. The manway open and close assist device of claim 1 further comprising said tubular housing having a first end member disposed at a first end of said tubular housing whereby said tubular housing rotates relative to said first end member and said tubular housing having a second end member disposed at a second end of said tubular housing whereby said tubular housing rotates relative to said second end member.

6. The manway open and close assist device of claim 5 wherein said first end member is fixedly coupled to a first lower hinge member and said a second end member is fixedly coupled to a second lower hinge member, and wherein each of said first and said second lower hinge members are attached to a vessel or tank.

7. The manway open and close assist device of claim 6, wherein said tubular housing is operably connected to a first upper hinge member and a second upper hinge member, and wherein said first and said second upper hinge members are attached to the manway cover.

8. The manway open and close assist device of claim 7, wherein said tubular housing includes a plurality of keys disposed at the first and the second ends of said tubular housing, and said first and said second upper hinge members include a plurality of slots, and wherein said plurality of keys at said first end of said tubular housing are received into a plurality of slots of said first upper hinge member, and said plurality of keys at said second end of said tubular housing are received into the plurality of slots of said second upper hinge member.

9. The manway open and close assist device of claim 1, wherein said tubular housing is cylindrical.

10. A manway open and close assist device comprising:
a threaded input screw mounted for rotation on a first end member and a second end member;
one or more anti-rotation member fixed to said first end member, said first end member operably connected to a first lower hinge member;
a piston mounted on said one or more anti-rotation members, said piston including a plurality of teeth disposed on an outer surface of said piston, and said piston having an internal aperture having a threaded surface, said threaded input screw being received and threadedly engaged with said internal aperture, wherein a rotation of said input screw causes a linear displacement of said piston;
a tubular housing for receiving said threaded input screw, said one or more anti-rotation member, and said piston, wherein said tubular housing has a plurality of helical grooves disposed on an inner surface of said tubular housing, said plurality of helical grooves receiving said plurality of teeth of said circular piston;
said tubular housing operably connected to at least one upper hinge member;
wherein said linear displacement of said piston within said tubular housing causes a rotation of said tubular housing due to engagement of said plurality of helical grooves on said inner surface of said tubular housing with said plurality of teeth of said piston, thereby causing a pivoting movement of said at least one upper hinge member.

11. The manway open and close assist device of claim 10, wherein said first end member is disposed proximate a first end of said tubular housing, and said second end member is disposed proximate to a second end of said tubular housing.

12. The manway open and close assist device of claim 11, wherein said second end member is fixedly connected to both said second end of said tubular housing and said at least one upper hinge member.

13. The manway open and close assist device of claim 11 wherein said first end member is disposed at a first end of said tubular housing so that said tubular housing rotates relative to said first end member, and said second end member coupled to a second lower hinge member and is disposed at a second end of said tubular housing so that said tubular housing rotates relative to said second end member.

14. The manway open and close assist device of claim 13, wherein said tubular housing includes a plurality of keys disposed at the first and the second ends of said tubular housing, and said first and said second upper hinge members include a plurality of slots, and wherein said plurality of keys at said first end of said tubular housing are received into a plurality of slots of said first upper hinge member and said plurality of keys at said second end of said tubular housing are received into the plurality of slots of said second upper hinge member.

\* \* \* \* \*